(No Model.) 2 Sheets—Sheet 2.

H. G. YATES.
ANTI-FRICTION BEARING.

No. 281,950. Patented July 24, 1883.

Witnesses:
Harry Drury
Jas. L. Skidmore

Inventor:
Henry G. Yates
by his attorneys
Howson & Sons (No Model.)  2 Sheets—Sheet 1.

H. G. YATES.
ANTI-FRICTION BEARING.

No. 281,950.  Patented July 24, 1883.

Witnesses:
Harry Drury
Jas. L. Skidmore

Inventor
Henry G. Yates
by his attorneys
Howson & Sons

UNITED STATES PATENT OFFICE.

HENRY G. YATES, OF PHILADELPHIA, PENNSYLVANIA, ASSIGNOR OF TWO-THIRDS TO LOUIS W. BOYER, OF SAME PLACE, AND REUBEN G. BRUSH, OF SAN FRANCISCO, CALIFORNIA.

ANTI-FRICTION BEARING.

SPECIFICATION forming part of Letters Patent No. 281,950, dated July 24, 1883.

Application filed June 2, 1883. (No model.)

*To all whom it may concern:*

Be it known that I, HENRY G. YATES, a citizen of the United States, residing in Philadelphia, Pennsylvania, have invented certain Improvements in Anti-Friction Bearings, of which the following is a specification.

My invention consists of an improvement, fully described hereinafter, in anti-friction roller devices for bearings, wheels, pulleys, &c., the object of my invention being to maintain two sets of anti-friction rollers, those of one set being larger in diameter than and alternating with those of the other set, in such relation to each other as to insure steadiness of action and freedom from friction.

Figure 5:
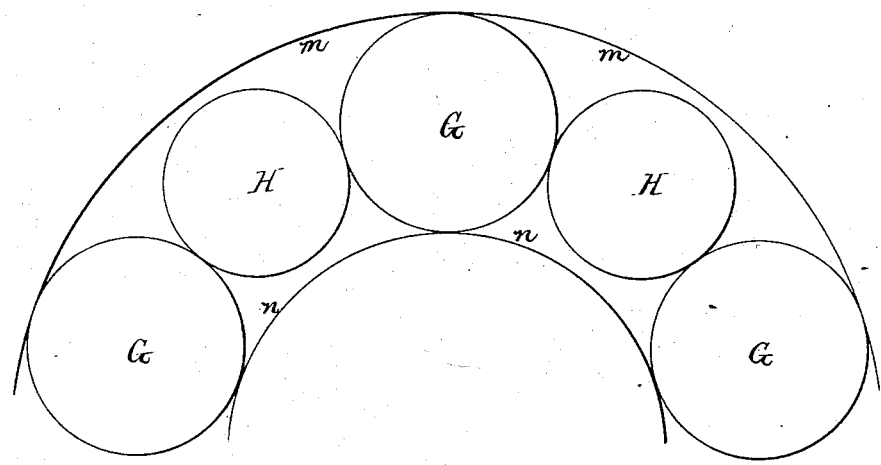
Figure 7:
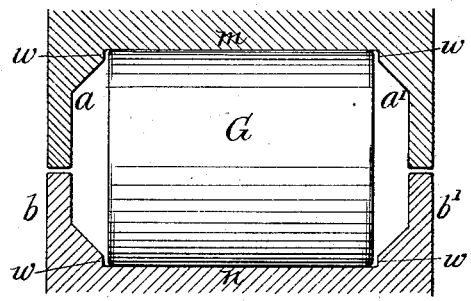
Figure 6:
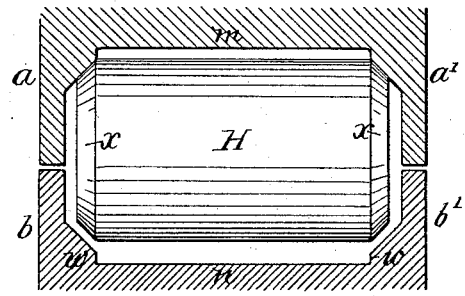
Figure 1:
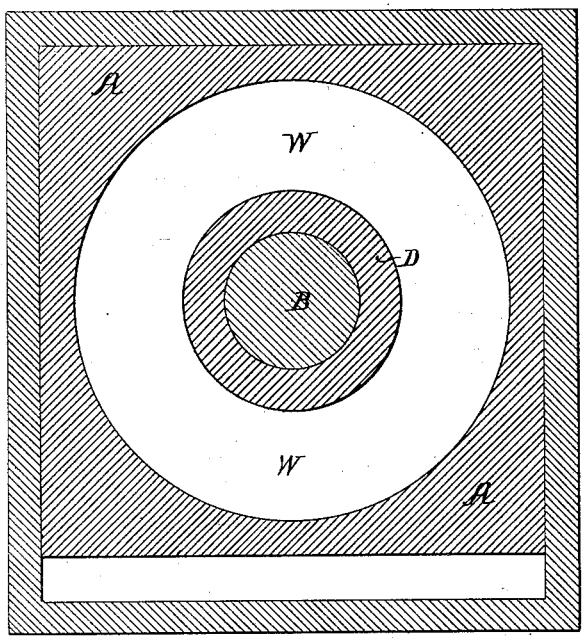
Figure 2:
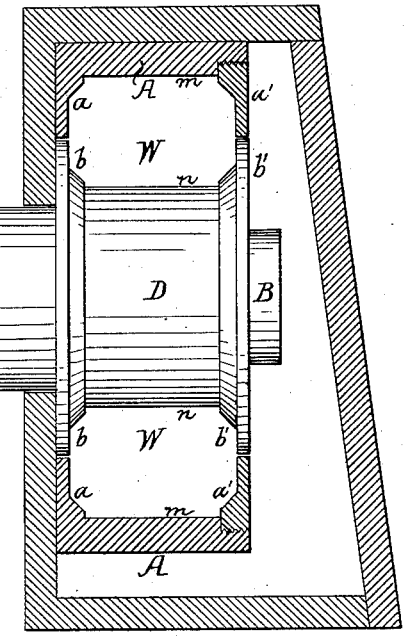
Figure 3:
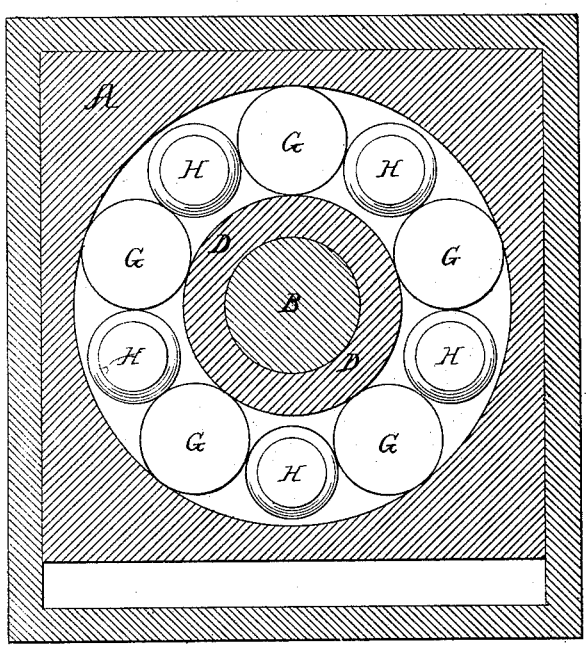
Figure 4:
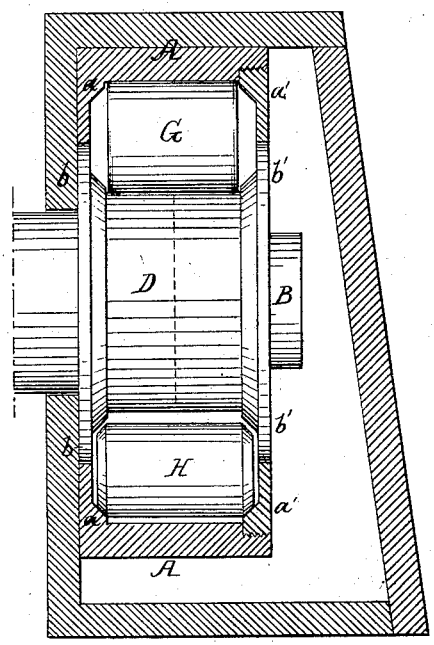

In the accompanying drawings, Figure 1, Sheet 1, is a section of a box and shaft or hub, showing the annular space between the two for the reception of anti-friction rollers, of which the ends are shown; Fig. 2, a vertical section of Fig. 1; Figs. 3 and 4, the same as Figs. 1 and 2 with the anti-friction rollers; Figs. 5, 6, and 7, Sheet 2, diagrams drawn to an enlarged scale to illustrate my invention.

The box A is in the present instance of quadrangular form and adapted to an outer casing for application to the hanger of a railroad-car; but the box may form part of a pillow-block, or of a hanger for shifting, or it may be a central portion of a pulley or sheave for revolving round a fixed shaft or round a hub thereon.

B is a shaft or axle, and D a hub secured to the same; or the hub may consist of a simple enlargement of the shaft.

Between the box and the hub is an annular space, W, Figs. 1 and 2, bounded by the flanges $a\ a'$ of the box and the flanges $b\ b'$ of the hub, these flanges being preferably of such depth that the flanges of the hub shall be near those of the box without being in absolute contact therewith, for the purpose of excluding particles of dust and dirt from the annular space. Within this space are arranged two sets of cylindrical rollers—five in each set in the present instance—the rollers G of one set being larger in diameter than the rollers H of the other set, and the larger rollers alternating with the small rollers, as shown in Figs. 3 and 4.

It should be here remarked that this arrangement of large and small rollers is of itself old in anti-friction devices, and that my invention consists in the manner, which I will proceed to explain, of combining the rollers with the box and hub, reference being had to the enlarged views, Figs. 5, 6, and 7.

The rollers G fit snugly in the annular space W between the periphery $n$, Fig. 5, of the hub and the annular bearing-surface $m$ of the box. By the "periphery of the hub" I mean the portion of the periphery between the flanges, the "annular bearing-surface of the box" meaning that portion of the surface between the flanges $a\ a'$.

The bodies of the small cylindrical rollers are never in contact either with the bearing-surface $m$ of the box or with the periphery of the hub, as will appear by reference to Fig. 5; but each small roller is always in contact with two adjoining large rollers, and the whole of the rollers always retain the relation shown to each other.

The small rollers cannot be dislodged by any radial movement toward the center of the hub, for this is prevented by the large rollers, and all outward dislodgment is prevented in the manner which will be best understood by reference to Fig. 6, where it will be observed that each small roller H is beveled at each end $x$ to accord with the beveled inner edges of the flanges $a\ a'$ of the box, which thus prevent all outward radial dislodgment of the small rollers, and at the same time maintain them free from contact with the annular bearing-surface $m$ of the box. In other words, while all the rollers are free to rotate and traverse in a circular course concentric with the axis of the shaft, their relation to each other, to the annular bearing-surface $m$ of the box, and to the periphery $n$ of the hub always remains unchanged, and it is this freedom from all play which insures the steady rotation of the shaft round a fixed bearing or of a sheave or pulley round a fixed shaft or hub.

It will be understood that the large rollers have to maintain the box and hub in proper relation to each other, and to resist all strains, the smaller rollers, which are never in contact with the flanges $b\ b'$ of the hub, but always in contact with the large rollers and with the flanges only of the box, maintaining the integrity of the entire system of rollers. I prefer to make the said large rollers with abrupt ends, as shown in Fig. 7, slight shoulders $w\ w$ on the hub preventing all end-play, and very little friction being caused by the bearing of the ends of the rollers against the said shoulders.

One of the flanges $a$ of the box is made separate from the latter for the introduction of the rollers into the annular space W, the flange being in the present instance screwed into the box; but it may be secured thereto by bolts or in any other available manner; or the hub may be made in two parts, as indicated by the dotted line in Fig. 4, the said parts being secured to each other after the rollers are in place.

I claim as my invention—

The within-described anti-friction device, in which two sets of cylindrical anti-friction rollers—those of one set being larger in diameter than and alternating with those of the other set—are combined with and interposed between a hub or shaft, D, and a box, A, provided with beveled flanges, which, bearing continuously against the beveled ends of the small rollers, prevent their outward displacement and maintain the whole of the rollers in the same unvarying relation to each other, substantially as set forth.

In testimony whereof I have signed my name to this specification in the presence of two subscribing witnesses.

HENRY G. YATES.

Witnesses:
  HARRY L. ASHENFELTER,
  JOHN E. PARKER.